United States Patent Office 3,035,871
Patented May 22, 1962

3,035,871
BRAKE SYSTEM AND NOVEL VALVE CONSTRUCTION THEREFOR
Cirino Giampapa, Massapequa, and Louis Sattarelle, Mount Vernon, N.Y., assignors to Hydra-Power Corporation, New Rochelle, N.Y., a corporation of New York
Filed June 3, 1959, Ser. No. 817,903
12 Claims. (Cl. 303—49)

This invention relates to hydraulic brake systems, and more particularly to valve means employed in such systems for automatically compensating for wear of a brake whereby, throughout its life when the brake is fully released, there will be a preselected clearance between the braking surfaces regardless of wear.

In hydraulic wheel brake systems heretofore proposed, in order to compensate for worn brake surfaces, such as worn brake linings, there have been employed slip friction devices or means which may be manually adjusted for urging brake linings toward the brake discs to compensate for brake wear. Such expedients necessarily complicate the problem of compensating for worn brakes and compromises the reliability of the worn brakes, particularly as they grow older and become more worn. Also, such slip friction devices are subject to a number of variable factors, such as the "consistency of friction" factor, proper torquing or loading, temperature effects, time deterioration of brake settings, and vibration, all of which may produce either excessive or insufficient brake clearance.

The invention also relates to a novel hydraulic brake valve system employing a master cylinder which may be of substantially more limited volume than devices of this character heretofore proposed by virtue of a novel compound valve feature whereby the ratio of the volume of braking fluid required to be put into such valve is a predetermined fraction (for example, one to two and one-half) of the volume of fluid put out by such valve for the purpose of producing initial braking, and when the latter occurs the input volume is automatically relatively increased whereby such ratio of volumes changes, for example, to one to one. This feature is of substantial importance in braking systems where it is desired for the master cylinder to be of limited volume, and where adequate initial clearance of the brake surfaces would not be possible otherwise without a much more complicated master cylinder. Thus only a small amount of brake fluid is needed to be injected into the novel compound brake valve, comprising one form of the present invention, as compared to the ejected volume required to take up the initial brake clearance.

One form of the novel construction embodying the present invention also includes means for enabling easy adjustment of the initial brake clearance to any desired amount by a simple external screw adjustment upon the novel valve. In braking systems of the prior art such adjustment has required expensive and complicated devices.

Also, in braking systems of the prior art it has not been possible, without extremely complicated and expensive apparatus, to permit a circulation of cool non-air-laden brake fluid to replace hot spongy air-laden fluid in the brake cylinders.

One form of the apparatus embodying the invention also embraces novel means for a direct interconnection between the brake cylinders of the system and the main reservoir thereof whereby such hot air-laden brake fluid from the heated brake cylinders may be circulated into the cooler non-air-laden brake fluid of the main reservoir and thereby replaced by such cooler fluid. With each brake stroke there is attained such a circulation.

The present invention also embodies novel means for bleeding off excessive pressures of brake fluid in the brake cylinders.

One of the objects of the present invention is to overcome the above difficulties or to reduce same to insignificance.

One form of apparatus embodying the present invention is referred to as a "compound brake adjuster valve," it being "compound" hydraulically in the sense that the aforementioned change of ratios is made possible during its operation, the valve requiring only a limited volume of input fluid to take up the initial brake clearance as compared to its output volume. Such novel valve embraces its "adjuster" feature by its ability automatically to adjust the position of the brake pistons (within the brake cylinders) to compensate for wear of the brake in such a manner that the initial clearance of the braking surfaces remains a selected constant value regardless of brake wear. A typical example of initial brake clearance may be .060 inch which will automatically be maintained throughout the life of the brake regardless of its wear. Such brake clearance, in the absence of the novel construction embodying the invention, would increase with brake wear and, for example, if the braking surfaces were worn down to the extent of .030 inch, this would be added to the initial brake clearance to produce a total clearance of .090 inch. Such undesired clearance might cause a serious delay in brake application. Such novel compound brake adjuster valve includes a valve body having a bore therein which is formed to accommodate a main piston which is of stepped diameter, that is, a piston having two coaxial portions, one of which is somewhat smaller in diameter than the other. The aforementioned bore accordingly is formed with a primary portion of the length thereof somewhat smaller in cross-sectional area than a secondary portion of the length thereof, such primary and secondary portions being adapted to accommodate respectively the smaller and larger portions of the stepped diameter piston. The smaller portion of such piston is referred to herein as a primary section and the secondary portion as a secondary section. The bore, of course, is of length sufficient to allow a selected axial movement of the piston and the latter forms primary and secondary end chambers respectively in the primary and secondary bore portions. The valve body is formed with the following passages therethrough: a first passage to an annulus-shaped chamber formed between the large piston section and one end of the larger or secondary bore; a second passage to the primary end chamber; and a third passage to the secondary end chamber. The novel compound adjuster valve is connected into a braking system as follows: The port of the second passage is referred to as a "return port" and is connected to a reservoir for brake fluid; the port for the first passage is connected directly to a source of fluid under pressure such as a foot or hand-operated power brake valve (master cylinder) which in turn receives fluid under pressure from a motor driven pump, the latter pumping fluid from such reservoir. The power brake valve returns fluid under pressure to the reservoir by means of a suitable return connection. Such a power brake valve may have a "fail-safe" feature whereby it can be actuated either by fluid under pressure from such pump or by fluid placed under pressure by manual or foot pressure. Such a power brake valve thus may be referred to as a "power-manual brake valve," sometimes abbreviated as "PMV." The port of the third passage aforementioned is connected directly to the brake cylinders in which the brake pistons are axially shiftable. The movable portion of the brake lining normally is rigidly secured to the brake cylinders and shiftable thereby into and out of contact with one or more movable brake discs which are rotatable with the wheels of the vehicle. A reaction member, usually of brake lining material, is stationarily positioned on the other side of each such brake disc in alignment with the axially shiftable brake lining material mounted upon the brake pistons. Thus each brake disc is squeezed between two brake lining members. In order to obtain the aforementioned compound action of the novel compound adjuster valve, it is constructed and arranged whereby only a small volume of fluid at a relatively high pressure is injected into such annulus chamber, this causing a relatively large volume of fluid at a lower pressure to be ejected from said secondary end chamber thereby to take up the initial brake clearance. Suitable means are provided for accomplishing said change in fluid input and output ratios of the novel valve as follows: At a preselected pressure, occurring in the first passage, slide valve means are provided for closing the aforementioned return port of the second passage (which theretofore was in communication with the primary end chamber) and connecting the second passage with the first passage thereby causing fluid from the power-manual valve (PMV) to act not only in the annulus chamber but also in the primary end chamber. Thus the volume of input fluid as compared to the volume of output fluid for the compound brake adjuster valve changes from, for example, a ratio of 1:2½ to 1:1. By this compounding principle it is possible to employ a substantially lower volume "master cylinder" (e.g. PMV) as compared to prior art constructions.

The novel wear adjusting feature embodied in the present invention exists by virtue of a novel poppet valve construction of the adjuster valve which, when closed, maintains the primary and secondary end chambers of such valve separate and out of communication with one another but when opened permits free access between such chambers. For reasons to appear later, the poppet valve is constructed to open at a pressure in the primary end chamber considerably above the aforementioned pressure in said second passage which actuates such slide valve device. For example, such slide valve may be so actuated at a pressure of 80 p.s.i. in the first passage and during increase in brake pressure the poppet valve may open in response to a pressure in the primary end chamber of 250 p.s.i., and during fall in brake pressure may close in response to a pressure of 250 p.s.i. in the secondary end chamber. When the power manual brake valve (PMV) of the present system is gradually actuated by gradually increasing pressure upon the foot pedal thereof, fluid under pressure at first is directed only into the annulus chamber thereby to expel fluid from the secondary end chamber and to take up the brake clearance until there is a zero brake gap. Further pressing upon the foot pedal will increase the pressure in such second passage (to the annulus chamber) until the aforementioned slide valve is actuated and fluid under pressure is directed also to the secondary end chamber until it reaches a preselected pressure, such as the aforementioned 250 p.s.i., whereupon the poppet valve is opened and the primary and secondary end chambers are placed in communication permitting fluid from the primary end chamber direct access to the brake cylinders. A spring acting on such main piston at this point will be effective to bottom the main piston against its outermost limit-stop at the outer extremity of the secondary end chamber, this occurring by virtue of the equalizing of fluid pressures on opposite sides of the main piston due to the opening of the poppet valve. Thereafter the brake pistons are shifted axially to accomplish braking at whatever pressure is called for by the pressing of the foot pedal of the PMV. Such braking may wear down the brake by some amount such as .010 and thereby cause each brake piston to shift an equal distance in its cylinder. An amount of brake fluid representing such wear (.010 inch) is urged into each brake cylinder by virtue of the open poppet valve. When the foot is removed from the brake pedal, obviously fluid pressure in the brake cylinders diminishes, for example, from 1500 p.s.i. down to a much lower pressure of the order of a few pounds per square inch, for example, 10 or 15 p.s.i., and during such reduction in pressure the aforementioned secondary end chamber is subjected to the preselected brake wear pressure of e.g. 250 p.s.i.

The poppet valve means are constructed and arranged to close at this pressure whereupon there is imprisoned between such main piston (and its poppet valve) and the brake pistons the aforementioned additional volume of brake fluid required to take up the .010 brake wear. The brake cylinders are provided with brake springs therein to urge the brake pistons back to their normal released condition and such brake springs are selected to be of a strength sufficient to create a pressure which can overcome the aforementioned main piston spring thereby to move the main piston (and poppet valve) assembly axially towards a limit-stop at the outer extremity of the primary end chamber. Such axial movement of the main piston will permit a complete release of the brakes. However, it will not permit the brake pistons to return to their initial position because of the aforementioned added increment of brake fluid which occupies the volume represented by the wear of the brake. Hence the brake piston is permitted to return to a position which is advanced from its original position in the amount of the wear, namely, .010. Hence an automatic adjustment for brake wear is accomplished.

The above and further novel features of the invention will more clearly appear from the description given below taken in connection with the accompanying drawings which are shown, by way of example only, and are not intended to define the limits of the invention, reference for this latter purpose being had to the appended claims.

Figure 3:
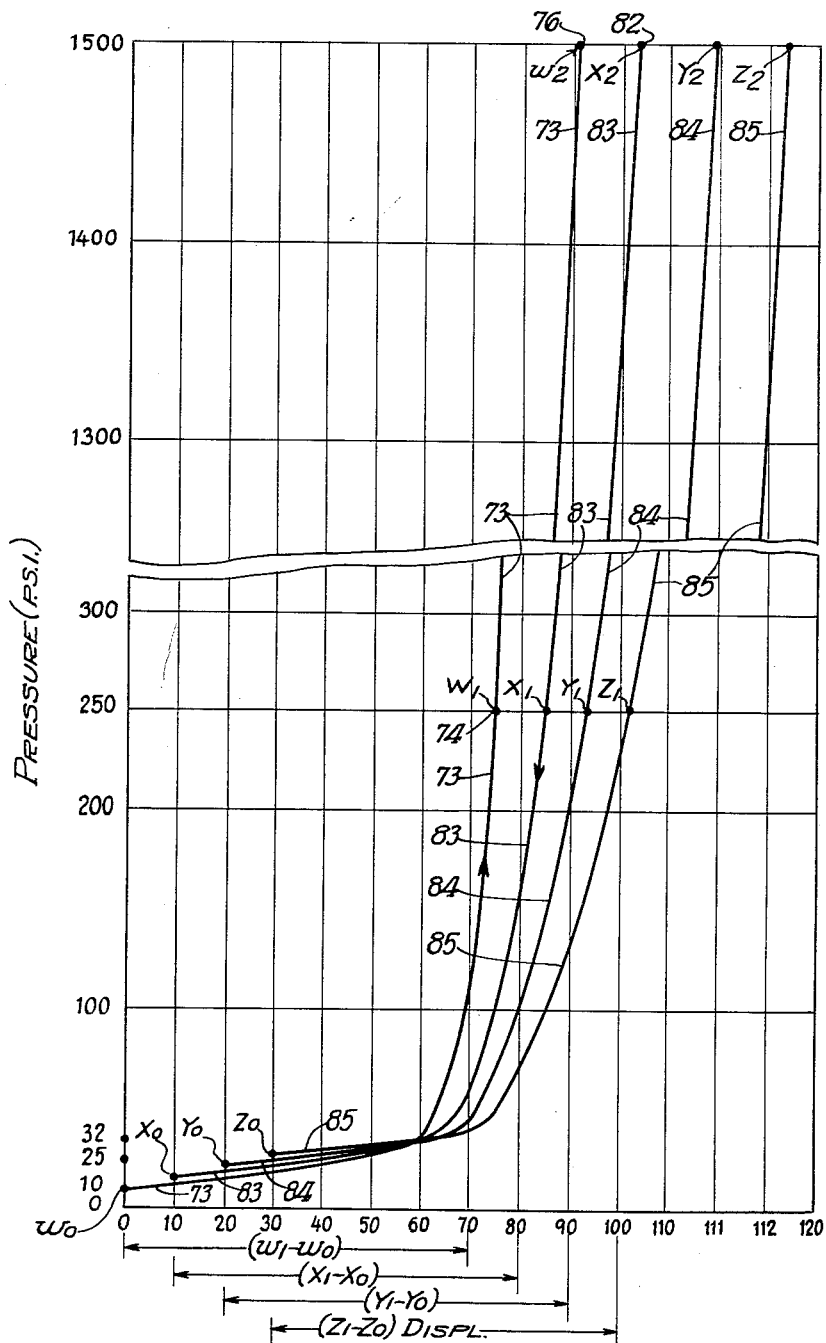

FIG. 3 is a graphic representation of changes in brake pressure plotted against changes in brake displacement or volume representing the operation of the apparatus embodying the present invention. This represents an idealized set of conditions and only tends to represent actual conditions rather than being exact, however, this figure is sufficiently accurate to illustrate operation of the invention.

Figure 1:
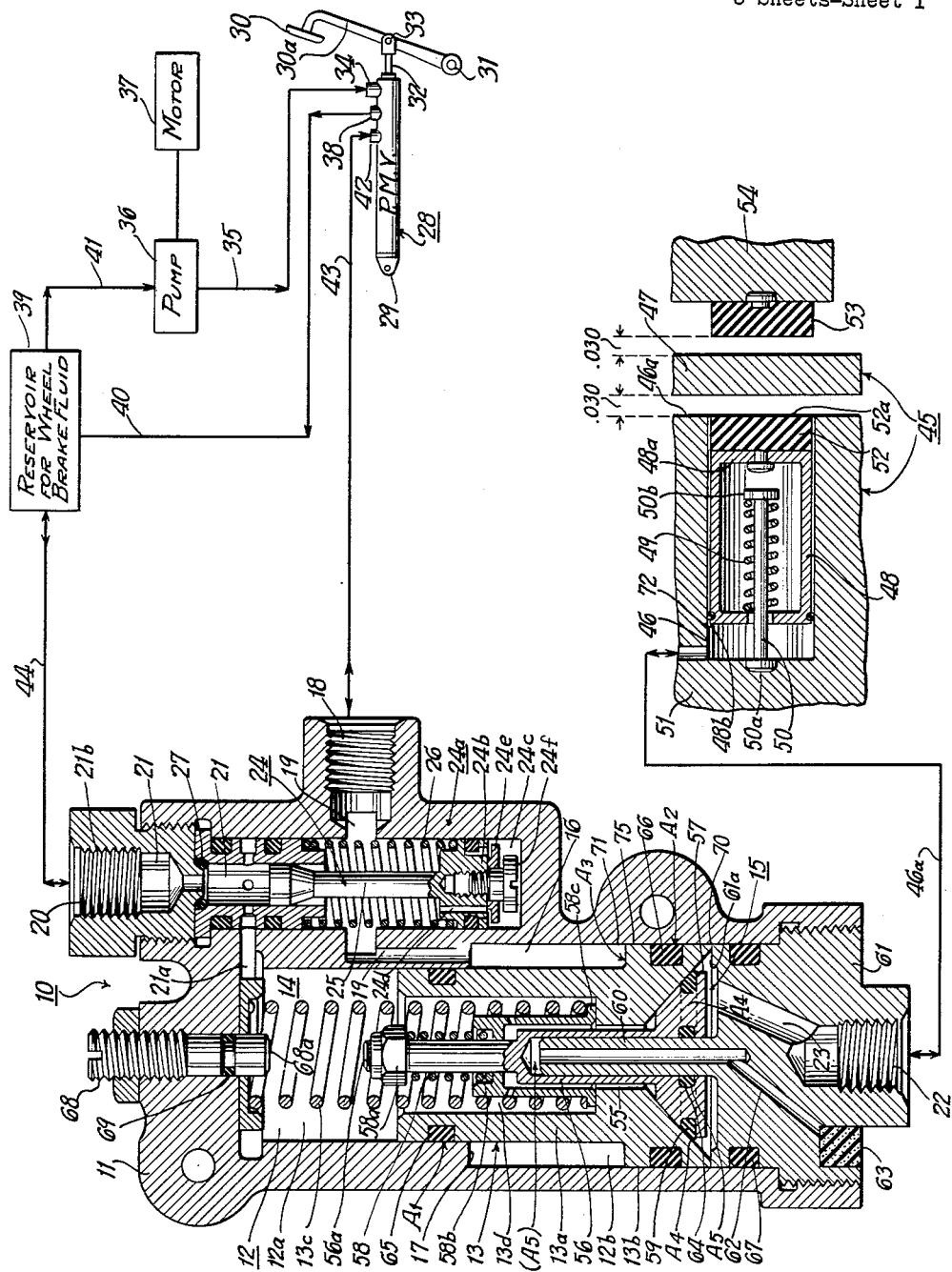
FIG. 1 is a schematic view of a novel braking system embodying the present invention and including a longitudinal cross-sectional view of the novel compound brake adjuster valve.

In the drawings, with particular reference to FIG. 1, the novel compound brake adjuster valve 10 includes a valve body 11 having a bore 12 therein which is shaped to accommodate a compound or stepped main piston 13. Accordingly, the bore 12 is formed with a primary portion 12a thereof somewhat smaller in cross-sectional area than a secondary portion 12b of the length thereof. The main piston 13 in the bore 12 thus is formed with a primary section 13a which is adapted to fit the bore portion 12 and is somewhat smaller in cross-sectional area than a secondary piston section 13b which is adapted to fit the secondary bore portion 12b. The bore 12 is of a length to allow axial movement of the piston 13 within selected stroke limits and the piston in the bore thus forms primary and secondary end chambers respectively designated 14 and 15 which are hence respectively in the primary and secondary bore portions. An annulus chamber 16 is formed between the secondary piston section 13b and in one extremity of the secondary bore portion. In the form shown, such annulus chamber is formed between an annular-shaped area $A_3$ comprising the uppermost shoulder (FIG. 1) of the secondary section of the main piston, and a stationary annular-shaped shoulder 17 comprising one extremity of the larger secondary bore portion.

The main piston 13 is urged downwardly, as viewed in FIG. 1, by means of a coil spring 13c. The latter is capable of exerting a preselected force upon the main piston 13 to bottom same (as viewed in FIG. 1), namely, to urge the main piston against its lowermost limit-stop under conditions which will be set forth in greater detail below. The spring 13c is capable of so bottoming the main piston 13 after the poppet valve mounted thereon is open and the primary and secondary end chambers thus are placed in communication.

For purposes of indicating how the novel compound brake adjuster valve 10 is connected to the remaining elements of the novel braking system, the several ports thereof will now be described, such ports giving access to passages to the several chambers therein. The valve body 11 is formed with a power manual valve (PMV) port 18 giving access to a first passage 19. The first passage 19, as shown in FIG. 1, is in communication with the annulus chamber 16. The valve body 11 is also formed with a second or return port 20 giving access to a second passage 21 which is in communication with the primary end chamber 14. Also, the valve body is formed with a brake cylinder port 22 giving access to a passage 23 in communication with the aforementioned secondary end chamber 15.

In order to accomplish the aforementioned compound action of the novel valve 10, there is operatively associated with the first and second passages 19 and 21 a slide valve construction 24 consisting of a valve spool 25 which is constructed and arranged for axial movement relative to both of said passages 19 and 21, and in the manner shown in FIG. 1 is normally held in its lowermost position, as viewed in this figure, by a spring 26 which maintains the first and second passages separate from one another. However, upon the occurrence of a preselected pressure in the first passage, for example, 80 p.s.i., the spring 26 is of such a selected strength that it is overcome by the force acting upon the spool 25. The latter thus is urged axially upwardly against an O-ring 27 thereby closing the port 20 and placing the first passage 19 in communication with section 21a of the passage 21 but closing off a section 21b of such passage. Thus fluid under pressure from a pressure source 28 is directed not only into the annulus chamber 16, but also into the primary end chamber 14 thereby effecting the above-described change in ratio of input volume to output volume of the novel valve 10.

The novel compound brake adjuster valve 10 is connected to the main elements of the braking system as follows: The power-manual brake valve 28 is provided which is pivotally mounted at one extremity 29 thereof and is actuatable by a foot pedal 30 pivotally mounted at 31 and connected to a valve rod 32 protruding from the extremity of the power-manual brake valve opposite to its pivoted extremity 29. Pedal lever 30a of the foot pedal 30 is pivotally associated at 33 with the brake rod 32. The power-manual brake valve 28 is provided with three ports, namely, a pressure port 34 which is directly connected by means of a connection 35 to a pump 36, the latter being driven by a motor 37. The second port of the PMV 28 is shown at 38 and is designated the return port, it being directly connected to a reservoir 39 by means of a connection 40. Note that the reservoir 39 is also connected to the input pump 36 by means of a connection 41. The third port designated brake port 42 is connected to the aforementioned port 18 of valve 10 by means of a pipe or connection 43.

The second or return port 20 of valve 10 is in communication with the reservoir directly by means of a pipe 44.

The brake cylinder port 22 of the novel valve 10 is in communication with a brake, generally designated at 45, which normally consists of three brake cylinders (there being only one shown for purposes of brevity). The single brake cylinder shown is designated 46 and is stationary relative to a brake disc 47, the latter being rotatable with the wheels (not shown) of the vehicle, such as an aircraft. The brake cylinder 46 is connected to the brake cylinder port 22 by means of a pipe 46a. Axially shiftable within the brake cylinder 46 is a brake piston 48 of conventional construction which is urged to the left, as viewed in FIG. 1, by means of a brake piston spring 49 which embraces a brake cylinder post 50 which is secured at its extremity 50a to a stationary mounting 51. At the opposite extremity 50b of the post 50 there is formed a suitable flange against which one end of the spring 49 may press, the opposite end of such spring pressing against the brake piston 48 in the manner shown. Rigidly secured to the outer extremity 48a of the piston 48 is a brake lining element 52 which is thus axially shiftable therewith to the right and left, as viewed in this figure, as the brake piston is subjected to changing pressure from the valve 10. A stationary reaction brake lining member 53 is also provided in alignment with the axially shiftable one 52 thereby to provide a member against which the brake disc 47 can be pushed, the brake disc thus being squeezable between the two brake lining members 52 and 53. The latter brake lining member is rigidly secured to a stationary mounting 54.

In order to control the speed of axial movement of the spool 25 of the slide valve 24, a dashpot device 24a is provided consisting of a dashpot piston 24b which is axially shiftable within a dashpot cylinder 24c. The dashpot piston is pressed downwardly, as viewed in FIG. 1, by the spring 26. A metering passage 24d is formed in the piston 24b which places in communication the chambers above and below such dashpot piston and in accordance with conventional dashpot operation permits the piston to move up, as viewed in FIG. 1, against the force of spring 26 in response to a preselected pressure in the first passage 19, such upward movement being regulated in speed by the action of the metering orifice or passage 24d. The lowermost mouth of such passage 24d is partially blocked in response to downward movement by means of an axially shiftable restricter plate 24e which is mounted upon and embraces a restricter plug 24f. The restricter plate 24e thus partially blocks the orifice of passage 24d only on the down stroke thereof and thus compels the downward movement of the valve spool 25 to be slow relative to the upward movement thereof. The purpose of the dashpot arrangement is to provide a careful control of axial movement of the slide valve to prevent a sharp pressure transition. When the brake is being applied and pressure is progressively increasing within the brake cylinder 46, the dashpot arrangement 24a permits the transition of volume ratios (namely, ratio of input volume via port 18 to output volume via port 22) to change relatively gradually in response to occurrence of the preselected pressure in the first passage 19, for example, 80 p.s.i. However, when the brake is being released and pressure is steadily decreasing in the passage 19, when such selected pressure there occurs, there will be a slight delay in the downward axial movement of the valve spool 25 by virtue of the partially blocked metering orifice 24d and this will cause an even more gradual opening of the second passage portion 21a to the reservoir 39 as compared to the closing of such passage on the upward stroke of such valve spool.

There will now be described the brake wear adjustment feature of the novel construction, with particular reference to poppet valve means which are employed for imprisoning sufficient fluid between the main piston 13 and the brake piston 48 to compensate for wear of the braking surfaces. For example, if the brake lining member 52 should wear to the extent of .020 inch, and it is desired to maintain an initial total braking clearance of .060 (0.30 on either side of the brake disc 47), then an increment of braking fluid representative of extra axial movement of the brake piston 48 caused by such wear is trapped between the main piston 13 and the brake piston 48. Thus, when the brake is released, the brake piston 48 bearing the worn brake lining member 52 will return not to its initial position but to a position somewhat advanced to the right thereof, as viewed in FIG. 2 to compensate for such worn lining whereby the righthand face 52a of the brake lining member 52 will be in alignment with the face 46a of the brake cylinder 46.

Accordingly, the main piston 13 is provided with a central bore 55 in which is axially shiftable a poppet valve shaft 56 of poppet valve 57. The shaft 56 protrudes into the primary end chamber 14 and the poppet valve is urged closed by means of a coiled poppet valve spring 58. The poppet valve 57 is of conventional conical design as shown and is provided with an O-ring 59 which comprises the effective sealing area for fluid in the primary end chamber 14.

The coil spring 58, in the form shown, is interposed between an adjustable stop nut 58a, which threadedly engages the uppermost extremity of the poppet valve shaft 56, and a sleeve-shaped member 58b which embraces the middle portion of the poppet valve shaft 56 and at its upper extremity is engaged by such spring 58. The lowermost extremity of the sleeve-shaped member 58b rests upon the bottom of a cylinder recess 13d formed in the upper portion of the main piston 13. The cylindrical recess 13d permits the spring 13c to be of a desired length. The latter spring preferably presses upon an outwardly extending flange 58c formed at the bottom of the sleeve-shaped member 58b.

The bore 55 is somewhat larger than the poppet valve shaft 56 thereby placing in communication the primary end chamber 14 and the area of the poppet valve 57 immediately above its O-ring 59. Hence fluid under pressure in the primary end chamber 14 acts upon the poppet valve 57 over an area equal to the area of the aforementioned O-ring 59 when the poppet is closed.

For purposes to appear more fully hereinafter, the central portion of the poppet valve shaft 56 is vented to the atmosphere as follows: The shaft 56 is provided with a bore in which protrudes a stationary tube 60, such tube preferably comprising an integral part of an end plug 61 of the valve body 11. Such tube has formed therein a passage 62 in communication with the atmosphere via a filter 63 mounted in the end plug 61. Note that the aforementioned third passage 23 is formed in the end plug 61.

Embracing the stationary tube 60, and positioned within a suitable internal groove formed in the bore of the poppet valve which accommodates such tube, is an O-ring 64.

Additional O-rings are provided in the novel construction as follows: the primary section 13a of the main piston 13 mounts an O-ring 65 in a peripheral groove thereof which forms a seal between the primary end chamber 14 and the annulus chamber 16. The secondary section 13b of said main piston 13 mounts an O-ring 66 (also in a peripheral groove thereof) which comprises a seal between the aforementioned annulus chamber 16 and the secondary end chamber 15.

The end plug 61 also preferably mounts in a peripheral groove thereof a suitable O-ring 67 which seals the secondary end chamber 15 from communication with the atmosphere.

The poppet valve main piston assembly (57, 13) is capable of axial movement between selected limit-stops as follows: the lowermost limit-stop comprises a shoulder 61a of the end plug 61, the main piston 13 being shown against such limit-stop in FIG. 1; and a threaded adjusting plug 63 having a lowermost extremity 68a which protrudes into the primary end chamber 14 and is axially aligned with the uppermost extremity 56a of the poppet valve post 56. Angular adjustment of the adjusting plug 68 is able to adjust the position of the uppermost limit-stop for the poppet valve 57 and, so long as the poppet valve is closed, plug 68 also will comprise an uppermost limit-stop for the main piston 13. However, the main piston, under conditions to be set forth below, is able to separate from the poppet valve, as for thermal relief, and against the force of the springs 13c and 58.

The adjusting plug 68 is preferably provided with a conventional O-ring seal mounted in a peripheral groove thereof, such O-ring being designated 69.

For purposes of clarifying the operation of the novel valve construction 10, the various valve areas and sealing areas will now be described:

$A_1$ = cross-sectional area of the primary end chamber 14.
  = area within the circumference of the O-ring 65.
  = maximum cross-sectional area of the primary portion 13a of the main piston 13.

$A_2$ = area within circumference of O-ring 66.
  = maximum cross-sectional area of the secondary portion 13b of the main piston 13.

$A_3$ = area of annulus chamber 16.
  = $(A_2 - A_1)$

NOTE.—The dimensions of $A_2$ and $A_1$ are selected to produce an $A_3$ which will require, in the form shown, one increment of volume input of fluid acting on $A_3$ to produce the aforementioned 2½ increments of fluid volume output from the secondary end chamber 15, thereby taking up quickly the clearance or slack in the brake. It is, of course, understood that any selected ratio of volumes may be had and that the aforementioned ratio of 1 increment of volume input to 2½ increments of volume output occurs only while the slide valve spool 25 is in its lowermost position as viewed in FIG. 1, the ratio changing, for example, to 1:1 in response to said valve spool shifting axially to its uppermost position as viewed in such figure.

$A_4$ = poppet valve 57 sealing area.
  = the effective sealing area for the fluid in the primary end chamber 14 above the poppet valve 57, there being communication between the upper surfaces of such poppet valve and the primary end chamber 14 via the annulus-shaped passage 55.
  = area within the circumference of the poppet valve O-ring 59.

$A_5$ = atmosphere vented internal area of the poppet valve.
  = area (internal) of the O-ring 64.
  = the cross-sectional area of the vented poppet post 60.

NOTE.—$(A_2 - A_4)$ = for example, ⅓$A_2$. (Note: The fraction ⅓ can be any other selected value designed preferably to give a sharp differential between normal residual brake pressure (which can vary between 10 and 25 p.s.i. respectively for a new and a worn brake) and thermal relief pressure, for example, 35 p.s.i. whereby the residual brake pressure, whatever its value, will not be able to open the poppet valve and drain the brake cylinder.)

$A_6$ = the area of the secondary end chamber.
  = $(A_2 - A_5)$

The several principal pressures are designated as follows:

$P_1$ = pressure in the primary end chamber 14 (acting on $A_1$).

$P_3$ = pressure in the annulus chamber 16 (acting on $A_3$).

$P_4$ = pressure acting on top of the poppet valve 57 (acting on $A_4$).

NOTE.—$P_1 = P_4$.

$P_5$ = atmospheric pressure.

$P_6$ = pressure in secondary end chamber 15 (acting on $A_2$).

NOTE.—$P_6$ = pressure in brake cylinder 46.

The operation of the novel construction is as follows:

Normally in a braking system, such as one designed for the landing wheels of an aircraft, the brake lining elements 52 and 53 (FIG. 1) are initially set so that the beginning clearance between them and the brake disc 47 totals, e.g., .060 inch, there being, for example, .030 clearance on each side of the wheel disc 47. The brake system is also normally adjusted so that there is a so-called initial preload or initial brake cylinder pressure of the order of 10 p.s.i. This is attributable to the action of the brake cylinder spring 49 and the action of the main piston spring 13c. The brake cylinder spring 49 is selected of such a strength that it creates a pressure which can overcome the spring 13c in response to the closing of the poppet valve 57 and thus, as will appear more fully below, can force upwardly the main piston with the poppet valve assembly. Nevertheless, the coaction of the springs 13c and 49 at the beginning of the operation of the brake system are capable of creating such initial preload pressure or initial brake cylinder pressure of, e.g., 10 p.s.i.

Furthermore, at the beginning of the operation of the compound adjuster valve 10, the main piston 13 is in a raised position substantially above that shown in FIG. 1 and wherein the uppermost extremity 56a of the poppet valve shaft 56 engages the lowermost extremity 68a of the adjusting plug 68. The poppet valve 57 at this time is closed and hence a lowermost corner 70 (FIG. 1) of the main piston 13 is positioned at point 71.

Figure 2:
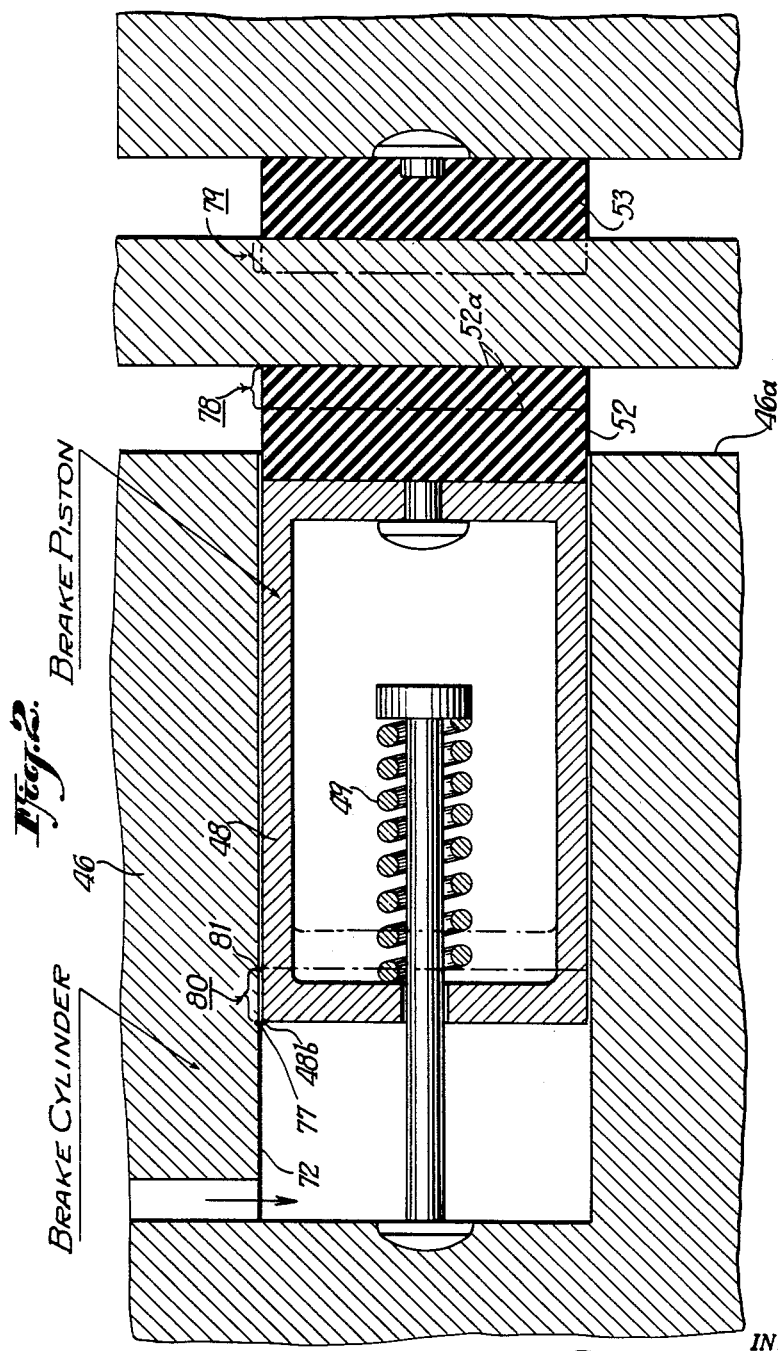
FIG. 2 is a longitudinal view, partly in section and with parts broken away, of a brake cylinder and piston assembly employed in the present invention, such assembly showing the braking parts in different operating positions indicating wear of the brake.

Also at this point the leftmost extremity of the brake piston 48 is positioned at point 72 within the brake cylinder 46 (FIGS. 1 and 2).

At this time the operator of the vehicle presses upon the foot pedal 30 actuating the power-manual valve 28 thereby directing fluid under pressure into the port 18 of the compound adjuster valve 10. Such fluid is immediately directed only into the annulus chamber 16 via the first passage 19 thereby forcing down the main piston 13 and ejecting fluid under pressure from the brake cylinder port 22 into the brake cylinder 46, thus axially advancing the brake piston 48 to take up the .060 brake gap or clearance, as shown in FIG. 2. As aforementioned, the ratio of increments of fluid input volume (via port 18) to fluid output volume (via port 22) is initially 1:2½ by virtue of the relationship of $A_3$ and $A_6$, namely, the annulus chamber area and the secondary end chamber area. The theoretical mechanical advantage during this time when there is no load upon the brake need not be great and in fact in this form is 2½:1. Referring to FIG. 3, there is graphically shown by line 73 the relationship of pressure to displacement for a new or unworn brake. It will be noted that the initial or preload pressure is of the order of 10 p.s.i. and that as the foot pedal is pressed and the brake cylinder pressure increases, the initial brake clearance is completely taken up at, for example, 32 p.s.i.

At this point it is desired to gain a greater mechanical advantage and to change the ratio of input volume to output volume of the valve 10 from 1:2½ to 1:1. Approximately at the pressure of 32 p.s.i. (and zero brake gap), the pressure in the first passage 19 is approximately 2½ times the brake pressure, namely, about 80 p.s.i., which is capable of raising the slide valve 24 to its uppermost position subject to the action of the dashpot 24a as above described. Hence there will be a regulated upward axial movement of the valve spool 25 thereby to shut off the return port 20, which is at atmospheric pressure, and to place the first passage 19 in communication with the primary end chamber 14 via the portion 21a of the second passage 21. Hence fluid at approximately 80 p.s.i. is directed into the latter chamber and the aforementioned transition in volumetric ratio (input to output) takes place. Thus during the initial operation of the brake system while the initial brake clearance (.060) is being taken up, there is a so-called trading of pressure for volume, that is, relatively high pressure of input fluid via port 18 is required to obtain a relatively high output volume via the brake cylinder port 22. Further pressure upon the foot pedal 30 will increase the pressure of the fluid acting in the primary end chamber 14 and annulus chamber 16 and hence in the brake cylinder 46 in the manner shown in FIG. 3 up to 250 p.s.i., namely, approximately up to the point 74 on the line 73. During such climb in brake cylinder pressure irregularities or warpage of the wheel discs, such as 47, are flattened out by the action of the brake lining elements 52 and 53 squeezing such brake discs. Such warpage or brake disc irregularities tend to prevent so-called "proportionality" of the pressure-displacement relationship or pressure-volume as shown in FIG. 3. However, when such pressure of 250 is reached, usually the defects or irregularities in the brake disc have been ironed out and thereafter substantial linearity or proportionality of the pressure displacement characteristic is attained. It is understood that pressures higher or lower than 250 may be capable of ironing out such irregularities or warping. However, in the form shown, 250 p.s.i. is selected for this purpose. When the pressure $P_1$ in the primary end chamber reaches such 250 p.s.i., the poppet valve 57 opens. At this point the main piston 13 has shifted axially downwardly somewhat below the point 71 by an amount representative of the advance of the brake piston 48. Such an axial shaft in the main piston 13, for example, may be down to the point 75 (FIG. 1).

With $P_1$ equal to 250 p.s.i., the forces acting above the poppet valve as compared to the forces acting below it are capable of opening such valve, this by virtue of the selection of the strength of the poppet spring 58 and the venting to the atmosphere of the poppet valve area $A_5$. A representation of the forces in action is as follows:
$(A_4 \times P_1) > (A_4 - A_5) \times P_6 + (A_5 \times P_5)$ + force of spring 58.
There may be a pressure differential on the top and bottom of the poppet valve of approximately 10 p.s.i. at this point and the poppet opens not because of such differential but because of the effect of the area $A_5$ vented to the atmosphere which insures that the poppet valve will open and remain open without chattering during the further increase of pressure in primary end chamber 14. Such opening of the poppet valve (with the corner 70 of the main piston 13 at point 75) thereby places in communication the primary end chamber 14 and the secondary end chamber 15, this occuring via the annular passage 55, it being understood, of course, that the sleeve-shaped member 58b which supports the poppet valve spring 58 is provided with suitable openings to permit free flow of fluid therethrough. Thus the pressures in such end chambers are promptly equalized and the main piston spring 13c is able immediately to bottom the main piston 13, and the aforementioned main piston corner 70 is urged to its lowermost position as shown in FIG. 1, the poppet valve all the while remaining open as the pressure of the braking fluid increases, for example, to the maximum operating pressure, in this case, for example, 1500 p.s.i. Such increase, as aforementioned, is substantially linear and reaches a point 76 (FIG. 3).

Referring to FIG. 2, the brake piston 48, at the outset of its axial advance, will have its corner 48b at the point 72 as aforementioned, and at zero brake gap such corner 48b will have advanced to the point 77. Assume that thereafter, upon application of higher brake pressure, the faces of the brake lining members 52 and 53 are worn down by the amounts 78 and 79, respectively, thereby causing the brake piston 48 to advance axially a corresponding amount 80 whereby said brake piston corner 48b advances from point 77 to point 81. Assume, for example, that the extent of such brake wear amounts to .010 inch. Such brake wear is represented in FIG. 3 by a shift from point 76 to point 82 which is representative of the extent of .010 of brake wear. Note that the brake piston spring 49 is more compressed as a result of such brake wear than it would normally have been in the absence of such wear.

Upon release of the brake, that is, upon release of pressure upon the pedal 30, the pressure in the brake cylinder falls as represented by the line 83. Thus when the brake cylinder pressure diminishes in accordance with such line 83, the poppet valve will close at 250 p.s.i., as above described, and the brake cylinder pressure will further diminish as indicated by the same line down to the point $X_0$. The point $X_0$ is .010 inch removed from the point $W_0$ of the line 73, this representing the extent of the wear of the brake. When the brake is again actuated, the curve 83 will be followed up to the point 82 and assuming a further wear of .010, the curve will shift to $Y_2$ at the maximum operating pressure and thence will follow the line 84 downwardly past the point $Y_1$, at 250 p.s.i., and thence down to the point $Y_0$ which in turn will be .010 inch removed from $X_0$. It will be noted that $$(W_1-W_0)=(X_1-X_0)=(Y_1-Y_0) \text{ etc.}$$

The line 85 which passes through the point $Z_0$, $Z_1$ and $Z_2$ represents performance of the brake with a wear of .030 inch and it will be noted that the point $Z_0$ is positioned at 25 p.s.i. this representing for this example the largest compression of the brake spring 49 which then creates the largest residual brake pressure.

Note, however, that by virtue of the open poppet valve 57 (the main piston 13 being bottomed and not able to eject any further brake fluid from the secondary end chamber 15), an additional increment of brake fluid is injected into the brake cylinder 46 which takes up or compensates for the wear of the brake represented by the axial movement 80 (FIG. 2) of the brake piston 48. This added increment of brake fluid is referred to as the wear increment and later is imprisoned between the brake piston 48 and the main piston 13 (the poppet valve 57 later being closed for this purpose).

As the pressure of the fluid falls, as represented by the line 83 (FIG. 3), the brake piston returns to the left, as viewed in FIGS. 1 and 2, and the pressure hence reaches the aforementioned critical point of 250 p.s.i. which, as aforementioned, is herein referred to as the brake wear adjustment pressure whereupon the poppet valve 57 closes and such wear increment of fluid (represented by 80 of FIG. 2) is imprisoned between the brake piston 48 and the closed poppet-main piston assembly (57; 13). At this point the brake piston spring 49 is capable of creating fluid pressure in the secondary end chamber 15 to overcome the main piston spring 13c and hence to "float" the main piston upwardly, that is, to force same upwardly by a carefully calibrated preselected amount which is determined by the distance between the upper extremity 56a of shaft 56 and the lower extremity 68a of the adjusting plug 68 as shown in FIG. 1. This upward axial movement of the main piston assembly determines the initial brake clearance, in this case .060. That is, it is desired to maintain an initial brake clearance of .060 inch regardless of brake wear and this is accomplished by the aforementioned imprisoning of the wear increment of brake fluid. Hence the main piston assembly will move upwardly until the poppet valve shaft 56 strikes the adjusting plug 68 whereupon it will stop and the initial brake clearance of .060 will be restored despite the wear 78 and 79 of the brake lining elements 52 and 53. Thus the righthand face 52a of the element 52 will be again in alignment or in register with the righthand face 46a of the brake cylinder 46.

During the time that the brake surfaces are in engagement substantial heat is generated and the brake fluid in the brake cylinder 46 becomes hot and air laden and hence somewhat spongy. This condition is alleviated by the communication between the brake cylinder and the reservoir 39 via the first passage 19 and the power-manual valve 28 and the connection 40 wherein relatively cooler fluid may reach the brake cylinder during each operative cycle of the novel valve construction 10. Also, note that when the pressure in the first passage 19 is reduced down to about 80 p.s.i., the slide valve spool 25 again shifts axially but now downwardly and with somewhat a delay by virtue of the dashpot restricter plate 24e, and the primary end chamber 14 thereby is placed in direct communication via pipe 44 with the reservoir 39 permitting hot air-laden brake fluid to be ejected from the novel valve 10 into the reservoir. Cool, clear non-air-laden brake fluid hence is directed into the primary end chamber 14 during the next downward stroke of the main piston 13, such cool brake fluid thus being able to reach the brake cylinder 46 to replace the spongy air-laden fluid therein.

The application of the brake, of course, generates great heat and this heat tends to warp the brake discs represented by brake disc 47 and thereafter each application of the brake may produce warping. It is desirable to imprison the aforementioned wear increment of fluid at the selected brake wear adjustment pressure (250 p.s.i.) while the warpage is ironed out of the brake disc. That is, the 250 p.s.i. is selected for the "brake wear adjustment pressure" because it is for most brakes high enough to insure that all the warpage is out of the brake discs at the time of the closing of the poppet valve. Even though the brake system may be new, there may be irregularities in the discs thereof, as aforementioned, and it is necessary to squeeze them hard enough to flatten them out before closing the poppet valve.

If the operator of the system desires to change the initial brake clearance, this can be easily accomplished by angularly shifting the adjusting plug 68. For example, if it is desired for the initial brake clearance to be .070 instead of .060 inch, the adjusting plug 68 is moved upwardly a suitable amount.

Note that there is a common brake wear adjustment pressure, namely, 250 p.s.i., in the form shown regardless of the setting of the adjustment plug.

However, it is possible to vary such brake wear adjustment pressure by adjustment of the poppet valve construction, for example, adjustment of the strength of the spring 58 and the areas $A_4$ and $A_5$.

The position of the adjustment plug 68 thus controls the volume of fluid which can be withdrawn from the brake cylinder 46 after the poppet valve closes. Hence if this is a constant volume, then necessarily there is attained a constant brake clearance regardless of brake wear. Thus the brake may progressively wear down fully and become entirely worn out and such volume of fluid which is drawn into the secondary end chamber 15 after the poppet closes is always constant. Note, however, that the volume of fluid in the brake cylinder under such conditions is not constant but rather is progressively increased by increments which represent the wear of the brake.

The compound brake adjuster valve 10 also embodies a novel thermal relief feature wherein excessive fluid pressure in the brake cylinder 46 due to thermal expansion is relieved under conditions which permit only the excessive part of the pressure to be evacuated and without the danger of the brake cylinder becoming drained of its fluid. That is, due to the ratio of the area $A_2$ of the O-ring 66 (which is the larger of the two cross-sectional areas of the main piston 13) to the poppet valve sealing area $A_4$, a sharp differential is achieved between normal residual brake pressure (e.g. 10 p.s.i. up to 25 p.s.i.) and the thermal relief pressure, for example, 35 p.s.i. This is further explained as follows:

The poppet spring 58 and the main piston spring 13c act together to determine the pressure at which the main piston 13 can be separated from the poppet 57 for thermal relief, the poppet shaft 56 at this time being in its uppermost position against the adjusting plug 68. Under these conditions the main piston 13 must be moved up and away from the poppet in order to achieve thermal relief. During the upstroke of the main piston 13, namely, while following the line such as 83 (FIG. 3) downwardly, it is necessary to overcome the aforementioned spring 13c and the area upon which the fluid acts is relatively large. Such area comprises $A_2$ and may be, for example, 1½ square inches. Consequently, if we assume that the force of the spring 13c is 15 pounds, then a residual brake pressure of slightly in excess of 10 p.s.i is required to force upwardly the main piston-poppet assembly against the adjusting plug 68. Thus 10 p.s.i × 1½ square inches = 15 pounds. As aforementioned, such residual pressure $P_6$ in the secondary end chamber must be at least slightly greater than 10 p.s.i., for example, 15 p.s.i. since we wish to overcome the spring 13c and not merely to achieve a balance of forces. Assuming that $P_6$ was 15 p.s.i., this being trapped in the secondary end chamber, such pressure is not able to separate the piston 13 from the poppet 57 because it can act only on ($A_2-A_4$). Assuming $A_4$ to be 1 square inch, this will provide a net area of ½ square inch and obviously the aforementioned $P_6$ of 15 p.s.i. is inadequate to separate the main piston from the stationary poppet. A $P_6$ pressure of slightly more than 30 p.s.i. is required so to separate the main piston and poppet, such pressure acting on the aforementioned ½ square inch providing the necessary force slightly greater than 15 pounds. I have found it desirable to construct and arrange the parts so that $P_6$ must be somewhat still higher, for example, 35 p.s.i., in order to separate the main piston from the poppet to achieve thermal relief. Such thermal relief pressure of 35 p.s.i. is selected because it is well above the highest residual pressure which can be created by the brake cylinder springs 49. Normally, the initial residual pressure of a new and unworn brake will be 10 p.s.i., as aforementioned, but as the brake wears and the spring 49 is further compressed, the initial residual pressure may rise to 25 p.s.i., as shown in FIG. 3. Also note that when moving the main piston 13 upwardly prior to engagement of the poppet shaft 56 with the adjusting plug 68, only the spring 13c need be overcome. However, after contact of the poppet shaft 56 with the adjusting plug 68, it is necessary to overcome both the spring 13c and the poppet spring 58 in order to separate the main piston from the poppet. Unless there is a definite pressure drop (sharp pressure differential) between the normal residual pressure (for example, 10 p.s.i. for a new brake and up to 25 p.s.i. for a worn brake) and thermal relief pressure (for example, 35 p.s.i.), then such residual pressure might separate the main piston and the poppet when not desired and drain the fluid from the brake cylinder.

The present novel construction also embodies an automatic compensation for contraction of the brake fluid or leakage loss thereof between the main piston 13 and the brake piston 48 as follows: If there is a leak between such main piston and brake cylinder, or if the brake fluid therebetween cools and contracts, then two factors compensate for this: (a) the brake cylinder spring 49 will take up the contraction (or fluid leakage loss) until such spring is fully extended and cannot so compensate any further; and (b) the main piston spring 13c will do the same.

What is claimed is:

1. In apparatus of the class described, a valve body having a bore therein, a main piston axially shiftable in said bore, said bore and piston respectively having interfitting sections forming a first end chamber and a second end chamber thereby subdividing such bore into two such end chambers and also an annulus-shaped chamber, said body having formed therein a first passage to said annulus chamber, a second passage in communication with said first end chamber, and a third passage in communication with said second end chamber, and means for closing such second passage and placing said first passage in communication with both said annulus and first end chambers in response to the occurrence of a selected pressure in said first passage, the annular cross-sectional area of said annulus chamber being a selected fraction of the cross-sectional area of said second end chamber, and poppet valve means, the latter being constructed and arranged for opening and placing in communication said end chambers in response to the occurrence of preselected pressures in said end chambers.

2. In an hydraulic braking system having one or a plurality of brake cylinders in each of which is mounted a brake piston, the latter being operatively associated with braking surfaces, said system also including means for placing under pressure within a selected pressure range fluid for acting upon such brake piston, the combination therewith of valve means interposed between said means for placing the fluid under pressure and the brake cylinder and piston assembly, such valve means having a main piston axially shiftable within a bore therein, said piston and bore being constructed and arranged to subdivide said bore into an annulus chamber and two end chambers, said valve means having passage means formed therein for placing said fluid pressure means in communication with said annulus chamber, means for placing said fluid pressure means in communication with one of said end chambers in response to the occurrence of a preselected pressure, and means including passage means for placing the other of said end chambers in communication with said brake cylinder, the transverse cross-sectional area of such annulus chamber being substantially less than that of said other end chamber.

3. In apparatus of the class described, a valve body having a bore therein, a primary portion of the length of such bore being smaller in cross-sectional area than a secondary portion of the length thereof; a main piston in said bore having primary and secondary sections of cross-sectional areas adapted respectively to fit said primary and secondary bore portions; said bore being of a length to allow axial movement of said piston therein within selected stroke limits, said piston in said bore thereby forming primary and secondary end chambers respectively in said primary and secondary bore portions, and also an annulus chamber between said secondary piston section and one extremity of such secondary bore portion; said body having formed therein a first passage to said annulus chamber, a second passage to such primary end chamber, and a third passage to such secondary end chamber; means for closing such second passage and placing said first passage in communication with said primary end chamber in response to the occurrence of a selected pressure in said first passage; spring means biasing said main piston towards said secondary end chamber; and poppet valve means mounted upon said main piston in the secondary end chamber and having spring means biasing same closed, said poppet valve means including a poppet valve having a bore therein of a selected area, and passage means for venting such bore to the atmosphere, and also including a poppet valve shaft which protrudes into and is axially shiftable within said primary end chamber, adjustable limit-stop means mounted on said valve body comprising a limit-stop for the axial movement of said poppet valve shaft in one direction of its motion toward the outer extremity of the primary end chamber, the effective sealing area of said poppet valve, the area of the latter valve vented to the atmosphere, and the forces of said poppet valve spring means and main piston spring means being selected to permit a preselected pressure in the secondary end chamber to separate the main piston from the poppet valve when the latter is engaging its limit-stop aforementioned.

4. In apparatus of the class described, a valve body having a bore therein; a main piston in said bore; said bore being of a length to allow axial movement of said piston therein within selected stroke limits, said piston in said bore forming end chambers; said body having formed therein a passage to one such end chamber, and another passage to the other end chamber; spring means biasing said main piston towards an extremity of one of said end chambers; and poppet valve means mounted upon said main piston and having spring means biasing same closed, said poppet valve means including a poppet valve having a bore therein of a selected area, and passage means for venting such bore to the atmosphere, and also including a poppet valve shaft which protrudes into and is axially shiftable within one of said end chambers, adjustable limit-stop means mounted on said valve body comprising a limit-stop for the axial movement of said poppet valve shaft in one direction of its motion toward the outer extremity of the last-mentioned end chamber, the effective sealing area of said poppet valve, the area of the latter valve vented to the atmosphere, and the forces of said poppet valve spring means and main piston spring means being selected to permit a preselected pressure in one of the end chambers to separate the main piston from the poppet valve when the latter is engaging its limit-stop aforementioned.

5. In apparatus of the class described, a valve body having a bore therein, a primary portion of the length of such bore being smaller in cross-sectional area than a secondary portion of the length thereof; a main piston in said bore having primary and secondary sections of cross-sectional areas adapted respectively to fit said primary and secondary bore portions; said bore being of a length to allow axial movement of said piston therein within selected stroke limits, said piston in said bore thereby forming primary and secondary end chambers respectively in said primary and secondary bore portions, and also an annulus chamber between said secondary piston section and one extremity of such secondary bore portion; said body having formed therein a first passage to said annulus chamber, a second passage to such primary end chamber, and a third passage to such secondary end chamber; means for closing such second passage and placing said first passage in communication therewith and thus also with said primary end chamber in response to the occurrence of a selected pressure in said second passage; spring means biasing said main piston towards said secondary end chamber; and poppet valve means mounted upon said main piston in the secondary end chamber and having spring means biasing same closed, said poppet valve means being constructed and arranged to open the valve thereof in response to the occurrence of a selected force differential between opposite sides of such valve thereby placing said end chambers in communication with one another.

6. Apparatus in accordance with claim 5 including means for adjusting the axial distance which said poppet valve means can move responsive to axial movement of said main piston from the secondary end chamber extremity to the primary end chamber extremity of such bore.

7. Apparatus in accordance with claim 5 including adjustable means for adjusting the extent of axial movement of said poppet valve means responsive to axial movement of said main piston whereby the volume of fluid drawn into such secondary end chamber is adjustable following a closure of such poppet valve means.

8. In apparatus of the class described, a valve body having a bore therein for the reception of a valve piston, said bore comprising a primary and a secondary portion, the latter being of larger cross-sectional area than the former; a main piston conformed to fit in such bore for axial movement therein within preselected stroke limits, said main piston ring formed with primary and secondary portions respectively of cross-sectional areas adapted to fit such primary and secondary bore portions aforementioned; said piston in the bore of said body thereby forming primary and secondary end chambers respectively situated at opposite extremities of said main piston and also forming an annulus chamber situated between said secondary portion of the main piston and an extremity of such secondary bore portion; said valve body also being formed with a first passage which places in communication the exterior of said body with said annulus chamber, a second passage placing in communication the exterior of said body with said primary end chamber, and a third passage placing in communication the exterior of said body with said secondary end chamber; spring means for biasing said main piston toward one extremity of its stroke and thus toward the outer extremity of such secondary end chamber; means for placing said first passage in communication with said primary end chamber in response to the occurrence of a preselected pressure in said first passage whereby fluid under pressure is directed simultaneously both to said annulus chamber and such primary end chamber; poppet valve means mounted upon said main piston and having operatively connected thereto spring biasing means for urging closed such poppet valve means, the latter being constructed and arranged to open in response to the occurrence of a preselected force differential acting on opposite sides of such poppet valve thereby placing in communication the primary and the secondary end chambers, the aforementioned means for placing in communication such first passage and said primary end chamber including passage valve means having operatively connected thereto spring means which normally maintain such second passage open, such passage valve means being closable in response to such selected pressure in the first passage thereby to place in communication the first passage and said primary end chamber, such passage valve means being actuatable by a pressure in such first passage substantially less than the pressure required to actuate such poppet valve means.

9. In apparatus of the class described a valve body having a bore therein for the reception of a valve piston, said bore comprising a primary and a secondary portion, the latter portion being of larger cross-sectional area than the former; a main piston conformed to fit in such bore for axial movement therein within preselected stroke limits, said main piston being formed with primary and secondary portions respectively of cross-sectional areas adapted to fit such primary and secondary bore portions aforementioned; said piston in the bore of said body thereby forming primary and secondary end chambers respectively situated at opposite extremities of said main piston and also forming an annulus chamber situated between said secondary portion of the main piston and an extremity of such secondary bore portion; said valve body also being formed with a first passage which places in communication the exterior of said body with said annulus chamber, a second passage placing in communication the exterior of said body with said primary end chamber, and a third passage placing in communication the exterior of said body with said secondary end chamber; resilient means for biasing said main piston toward one extremity of its stroke and thus toward the outer extremity of such secondary end chamber; means for placing said first passage in communication with said second passage in response to the occurrence of a preselected pressure in said first passage whereby fluid under pressure is directed both to such annulus chamber and such primary end chamber; a poppet valve mounted upon said main piston and having operatively connected thereto biasing means for urging same closed, such poppet valve being constructed and arranged to open in response to the occurrence of a preselected pressure in such primary end chamber acting on one face of said valve as compared to a preselected pressure in such secondary end chamber acting upon a smaller area of the opposite face of said valve, thereby placing in communication the primary and secondary end chambers, the aforementioned means for placing in communication such first and second passages including passage valve means having operatively connected thereto resilient means which normally maintain such second passage open, such passage valve means being closable in response to such selected pressure in the first passage thereby to place in communication the first and second passages, such passage valve means being actuatable by a pressure in such first passage substantially less than the pressure required to actuate such poppet valve means.

10. In apparatus of the class described, a valve body having a bore therein, a primary portion of the length of such bore being smaller in cross-sectional area than a secondary portion of the length thereof; a main piston in said bore having primary and secondary sections of cross-sectional areas adapted respectively to fit said body bore portions; said body being constructed to allow a selected axial movement of said piston in such bore, said piston in said bore thereby forming primary and secondary chambers respectively in said primary and secondary bore portions, and also an annulus chamber between said secondary piston section and one extremity of such secondary bore portion; said body having formed therein a first passage to said annulus chamber, a second passage to such primary end chamber, and a third passage to such secondary end chamber; means for closing such second passage and placing said first passage in communication therewith and thus also with said primary end chamber in response to the occurrence of a selected pressure in said second passage; spring means biasing said main piston towards said secondary end chamber; and poppet valve means mounted upon said main piston in the secondary end chamber and having spring means biasing same closed, said poppet valve means being constructed and arranged to open in response to the occurrence of a selected pressure in said primary end chamber acting on the area of one side of such poppet valve, a selected portion of the area of the opposite side of such valve being vented to atmosphere via another passage formed in such body.

11. In apparatus of the class described, a valve body having a bore therein, a primary portion of the length of such bore being smaller in cross-sectional area than a secondary portion of the length thereof; a main piston in said bore having primary and secondary sections of cross-sectional areas adapted respectively to fit said primary and secondary bore portions; said piston in said bore forming primary and secondary end chambers respectively in said primary and secondary bore portions, and also an annulus-shaped chamber between said secondary piston section and one extremity of such secondary bore portion, said body having formed therein a first passage to said annulus chamber, such first passage having a port, a second passage in communication with such primary end chamber, such second passage also having a port, and a third passage in communication with the secondary end chamber and also having a port; and means for closing such second passage and placing said first passage in communication therewith and thus in communication with both said annulus and primary end chambers in response to occurrence of a selected pressure in said second passage, the annular cross-sectional area of said annulus chamber being a preselected fraction of the cross-sectional area of said secondary section of the main piston.

12. In apparatus of the class described, a valve body having a bore therein, a primary portion of the length of such bore being smaller in cross-sectional area than a secondary portion of the length thereof; a main piston in said bore having primary and secondary sections of cross-sectional areas adapted respectively to fit said primary and secondary bore portions; said piston in said bore forming primary and secondary end chambers respectively in said primary and secondary bore portions, and also an annulus-shaped chamber between said secondary piston section and one extremity of such secondary bore portion, said body having formed therein a first passage to said annulus chamber, such first passage having a port, a second passage in communication with such primary end chamber, such second passage also having a port, and a third passage in communication with the secondary end chamber and also having a port; means for closing such second passage and placing said first passage in communication therewith and thus in communication with both said annulus and primary end chambers in response to occurrence of a selected pressure in said second passage, the annular cross-sectional area of said annulus chamber being a preselected fraction of the cross-sectional area of said secondary section of the main piston; valve means constructed and arranged for placing in communication said end chambers in response to the occurrence of preselected fluid pressures in said chambers; and means for urging said main piston towards an extremity of said secondary end chamber.

References Cited in the file of this patent

UNITED STATES PATENTS

| | | |
|---|---|---|
| 1,569,143 | Robinson | Jan. 12, 1926 |
| 1,620,115 | MacKenzie | Mar. 8, 1927 |
| 2,867,089 | Parmerlee | Jan. 6, 1959 |

FOREIGN PATENTS

| | | |
|---|---|---|
| 374,150 | Great Britain | June 61, 1932 |
| 913,134 | France | May 20, 1946 |
| 671,186 | Great Britain | Apr. 30, 1952 |
| 1,130,463 | France | Oct. 1, 1956 |
| 953,943 | Germany | Dec. 6, 1956 |